(12) United States Patent
Yamazoe et al.

(10) Patent No.: US 10,193,190 B2
(45) Date of Patent: Jan. 29, 2019

(54) BATTERY CONTROL SYSTEM

(71) Applicant: HITACHI, LTD., Tokyo (JP)

(72) Inventors: Takanori Yamazoe, Tokyo (JP); Shuko Yamauchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 414 days.

(21) Appl. No.: 15/032,448

(22) PCT Filed: Nov. 1, 2013

(86) PCT No.: PCT/JP2013/079703
§ 371 (c)(1),
(2) Date: Apr. 27, 2016

(87) PCT Pub. No.: WO2015/063945
PCT Pub. Date: May 7, 2015

(65) Prior Publication Data
US 2016/0268642 A1    Sep. 15, 2016

(51) Int. Cl.
*H01M 2/34* (2006.01)
*H01M 10/42* (2006.01)
*H01M 10/48* (2006.01)

(52) U.S. Cl.
CPC ..... *H01M 10/425* (2013.01); *H01M 10/4207* (2013.01); *H01M 10/482* (2013.01); *H01M 2010/4271* (2013.01); *H01M 2010/4278* (2013.01); *H01M 2220/20* (2013.01)

(58) Field of Classification Search
CPC ........... H01M 10/425; H01M 10/4207; H01M 10/482; H01M 2010/4271
See application file for complete search history.

(56) References Cited

U.S. PATENT DOCUMENTS

| 9,564,762 | B2 * | 2/2017 | Lee ........................ H02J 7/0016 |
| 2012/0112685 | A1 * | 5/2012 | Hartley ................. B60L 3/0038 320/106 |
| 2012/0250561 | A1 | 10/2012 | Kubota et al. | |
| 2012/0280573 | A1 | 11/2012 | Ohkura et al. | |

(Continued)

FOREIGN PATENT DOCUMENTS

| JP | 2005-135762 A | 5/2005 |
| JP | 2010-146991 A | 7/2010 |

(Continued)

*Primary Examiner* — Abdullah Riyami
*Assistant Examiner* — Nader Alhawamdeh
(74) *Attorney, Agent, or Firm* — Volpe and Koenig, P.C.

(57) ABSTRACT

A battery control system is provided with a plurality of battery cell management devices that are provided respectively corresponding to a plurality of battery cell groups each constituted by one or a plurality of battery cells and each acquire a measurement result of the state of charge of the battery cell of the corresponding battery cell group and an assembled battery management device for wirelessly communicating with the battery cell management devices. When it is impossible to wirelessly communicate with any of the battery cell management devices, the assembled battery management device wirelessly communicates with the said any of the battery cell management devices via any of other battery cell management devices except the said any of the battery cell management devices.

3 Claims, 5 Drawing Sheets

(56) References Cited

U.S. PATENT DOCUMENTS

| | | | |
|---|---|---|---|
| 2013/0093383 A1* | 4/2013 | Kim | H02J 7/0026 320/107 |
| 2014/0347014 A1* | 11/2014 | Lee | H02J 7/0016 320/134 |
| 2016/0268642 A1* | 9/2016 | Yamazoe | H01M 10/4207 |

FOREIGN PATENT DOCUMENTS

| | | |
|---|---|---|
| JP | 5008782 B1 | 8/2012 |
| JP | 2012-182903 A | 9/2012 |
| JP | 2012-198836 A | 10/2012 |
| JP | 2012-222913 A | 11/2012 |
| JP | 2013-085363 A | 5/2013 |
| WO | 2011/089928 A1 | 7/2011 |
| WO | 2013/051688 A1 | 4/2013 |

\* cited by examiner

BATTERY CONTROL SYSTEM

TECHNICAL FIELD

The present invention relates to a battery control system.

BACKGROUND ART

Currently, under the circumstances where the global environmental issues are greatly highlighted, reduction of carbon dioxide gas emission has been demanded in order to prevent global warming. For example, automobiles with gasoline engines which are major emission sources of the carbon dioxide gas have begun to be replaced with alternatives such as hybrid electric vehicles and electric vehicles. Typical large secondary batteries as power sources for hybrid electric vehicles and electric vehicles need to have high output and a large capacity. Therefore, the storage buttery module constituting this is generally composed of a plurality of battery cells configured by series-parallel connections.

As the secondary battery of large capacity, lithium-ion batteries are widely known. The handling of the lithium-ion battery needs a measure to prevent a high voltage charge and performance degradation due to over-discharge. Therefore, the storage battery module mounted on a hybrid electric vehicle or an electric vehicle and configured by using a lithium-ion battery as each battery cell, generally, has a function of monitoring the battery conditions, such as a voltage, current, temperature for each battery cell.

As an apparatus for monitoring the state of each battery cell as described above, for example, a state monitoring device disclosed in PTL 1 listed below is known. A wireless tag of the electromagnetic induction type is provided in a module for measuring the voltage value of each battery cell, and the state monitoring device transmits a voltage value of each battery cell to a reader by a wireless signal using the wireless tag. Thereby, the cost of wiring and insulation is reduced.

Further, PTL 2 discloses a storage battery control system which has a plurality of battery packs in which a plurality of slave unit controllers are connected to a master unit controller. In the storage battery control system, when a failure occurs in the master unit controller and the communication between the master unit controller and the slave unit controller becomes impossible, the slave unit controller connects and communicates with a master unit controller of another battery pack. Thus the situation in which the control of the storage battery by the slave unit controller becomes impossible is prevented.

CITATION LIST

Patent Literature

PTL1: Publication of Patent No. 2005-135762
PTL2: Publication of Patent No. 2012-182903

SUMMARY OF INVENTION

Technical Problem

In the control method of a battery cell disclosed in PTL 1, when a communication failure occurs on a path of the wireless communication, the state of each battery cell cannot be monitored. On the other hand, in the storage battery control system disclosed in PTL 2, although the incommunicable state caused by a failure of the master unit controller can be avoided, when the master unit controller and the slave unit controller are connected with each other wirelessly, the communication failure which occurs on a path of the wireless communication cannot be avoided.

Solution to Problem

A battery control system according to an aspect of the present invention includes: a plurality of battery cell management devices that are provided respectively corresponding to a plurality of battery cell groups each constituted by one or a plurality of battery cells and that each acquire a measurement result of a state of charge of the one or the plurality of battery cells of corresponding one of the plurality of battery cell groups; and an assembled battery management device that performs wireless communication with the plurality of battery cell management devices, wherein when the wireless communication with any of the plurality of battery cell management devices is impossible, the assembled battery management device performs the wireless communication with the any of the plurality of battery cell management devices through one of the plurality of battery cell management devices except the any of the plurality of battery cell management devices.

A battery control system according to an aspect of the present invention includes: a plurality of battery cell management devices that are provided respectively corresponding to a plurality of battery cell groups each constituted by one or a plurality of battery cells and that each acquire a measurement result of a state of charge of the one or the plurality of battery cells of corresponding one of the plurality of the battery cell groups; and an assembled battery management device that performs wireless communication with the plurality of battery cell management devices, wherein when the wireless communication with any of the plurality of battery cell management devices is impossible, the assembled battery management device performs the wireless communication with the any of the plurality of battery cell management devices by changing one or both of a frequency and transmission output of the wireless communication.

Advantageous Effects of Invention

According to the present invention, a communication failure which has occurred on a path of the wireless communication between the battery cell management device and the assembled battery management device can be avoided.

DESCRIPTION OF EMBODIMENTS

First Embodiment

Figure 1:
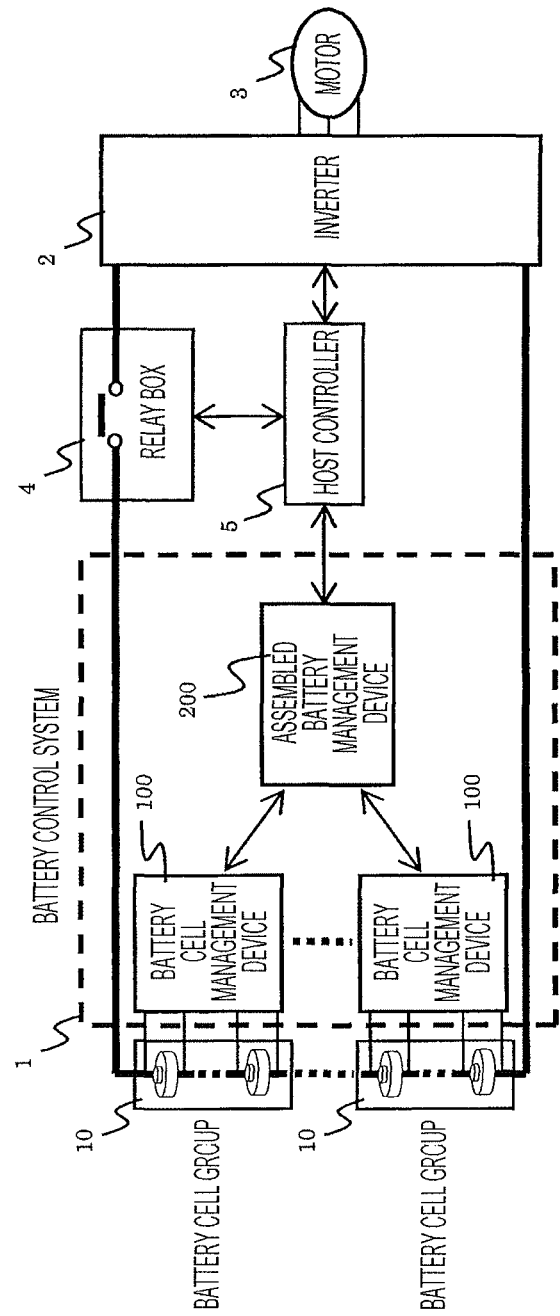
FIG. 1 is a diagram illustrating a configuration of an in-vehicle system including a battery control system according to an embodiment of the present invention.

FIG. 1 is a diagram showing a configuration of an in-vehicle system that includes a battery control system according to an embodiment of the present invention. The in-vehicle system shown in FIG. 1 is intended to be mounted on a vehicle such as a hybrid electric vehicle or an electric vehicle, and is provided with a battery control system 1, an inverter 2, a motor 3, a relay box 4 and a host controller 5.

The battery control system 1 is connected to one or a plurality of battery cell groups 10 each constituted by one or a plurality of battery cells, the battery cell management device 100 is provided corresponding to each battery cell group 10. Each battery cell management device 100 performs measurements (voltage, current, temperature, etc.) related to the state of charge (SOC: State of Charge) and the state of deterioration (SOH: State of Health) of the battery cell group 10. Then, each battery cell management device 100 performs wireless communication with the assembled battery management device 200 using the power supplied from the battery cell of the battery cell group 10, and sends measurement results relating to the state of charge and the state of deterioration of the battery cell group 10 to the assembled battery management device 200. The details of the communication taking place at this time will be described later.

The assembled battery management device 200 acquires, from each battery cell management device 100, the measurement results related to the state of charge and the state of deterioration of the battery cell group 10 corresponding to the battery cell management device 100. Then, the assembled battery management device 200 estimates the state of charge or the state of deterioration of the battery cell group 10 based on the obtained measurement results, and transmits the estimated results to the host controller 5.

The host controller 5 controls the inverter 2 and the relay box 4 on the basis of the estimation result of the state of charge or the state of deterioration of the battery cell group 10, which has been transmitted from the assembled battery management device 200. By converting the DC power supplied from each battery cell group 10 into three-phase AC power and supplying the power to the motor 3, the inverter 2 rotationally drives the motor 3 for generating a driving force of the vehicle when the relay box 4 is in the conductive state. Further, at the time of braking the vehicle, the battery cells of each battery cell group 10 are charged by converting three-phase AC regenerative power generated by the motor 3 into DC power and outputting the DC power to each battery cell group 10. Such an operation of the inverter 2 is controlled by the host controller 5.

Figure 2:
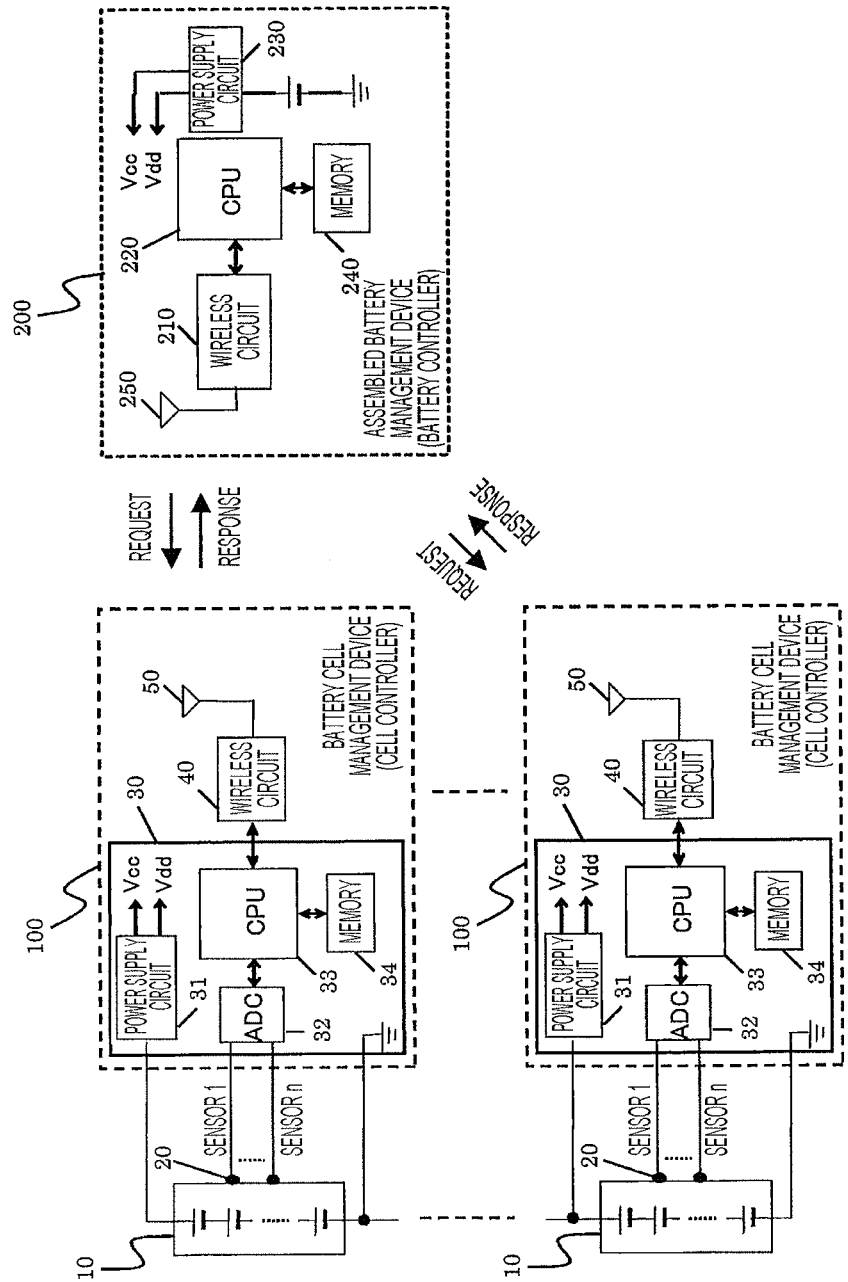
FIG. 2 is a basic configuration diagram of a battery control system according to an embodiment of the present invention.

FIG. 2 is a basic configuration diagram of a battery control system according to an embodiment of the present invention. This basic configuration diagram shows the battery cell group 10, the battery cell management device 100 and the assembled battery management device 200 among structures of the in-vehicle system shown in FIG. 1, as basic components.

In FIG. 2, the assembled battery management device 200 performs wireless communication with each of the battery cell management devices 100. By this wireless communication, the assembled battery management device 200 can request the measurement information and the cell balancing of each battery cell of the corresponding battery cell group 10 from each battery cell management device 100. In response to a request from the assembled battery management device 200, each battery cell management device 100 transmits the measurement information of each battery cell of the corresponding battery cell group 10 to the assembled battery management device 200, or performs the cell balancing.

Each battery cell management device 100 includes a plurality of sensors 20 provided respectively for battery cells of the corresponding battery cell group 10, a processing unit 30, a wireless circuit 40 and an antenna 50. The processing unit 30 includes a power supply circuit 31, an AD converter 32, a CPU 33, and a memory 34. Each sensor 20 is a sensor for measuring the state of each battery cell of the battery cell group 10, and is constituted by a voltage sensor, a current sensor, a temperature sensor or the like. The measurement results of the battery cell state measured by the sensor 20 are converted into digital signals by the AD converter 32 and are output as the measurement information to the CPU 33. The sensor 20 and the AD converter 32 configure the measurement circuit to measure the state of each battery cell of the battery cell group 10.

The power supply circuit 31 receives power supplied from the battery cell of the battery cell group 10 and generates power supply voltages Vcc and Vdd based on this. The power supply voltage Vcc is used as an operating power supply for the AD converter 32 and CPU 33, and the power supply voltage Vdd is used as an operating power supply for the wireless circuit 40. The power supply circuit 31 can receive power from at least any one of the battery cells constituting the battery cell group 10.

The CPU 33 executes a process for controlling the operation of the battery cell management device 100. For example, the CPU 33 allows the memory 34 to store measurement information of each battery cell output from the AD converter 32, and in addition, performs transmission processing for transmitting wirelessly the measurement information stored in the memory 34 to the assembled battery management device 200 in response to a request from the assembled battery management device 200. In the transmission process, the CPU 33 transmits the measurement information according to the state of each battery cell to the assembled battery management device 200 by controlling the wireless circuit 40 in accordance with the measurement information read out from the memory 34. Further, when the balancing request is transmitted from the assembled battery management device 200, the CPU 33 performs the balancing process for equalizing the state of charge of each battery cell of the battery cell group 10, by controlling the balancing switches (not shown). Other than this, various processing can be executed in the CPU 33.

The wireless circuit 40 is a circuit that performs processing and control for performing wireless communication between the battery cell management device 100 and the assembled battery management device 200. A wireless signal transmitted from the assembled battery management device 200 and received by the antenna 50 is demodulated by the wireless circuit 40 and is output to the CPU 33. Thus, the request content from the assembled battery management device 200 is decoded by the CPU 33, and processing according to the request content is executed in the CPU 33. The wireless circuit 40 uses the power supply voltage Vdd supplied from the power supply circuit 31, and modulates the obtained measurement information according to a predetermined transmission frequency, and then outputs the measurement information to the antenna 50. Thus, the measurement information corresponding to the state of each battery cell of the battery cell group 10 is transmitted from the battery cell management device 100 to the assembled battery management device 200.

The assembled battery management device 200 includes a wireless circuit 210, a CPU 220, a power supply circuit 230, a memory 240 and an antenna 250. The power supply circuit 230 generates power supply voltages Vcc and Vdd similarly to the power supply circuit 31 of the battery cell management device 100, based on the power supplied from a built-in battery in the assembled battery management device 200. Incidentally, power supplied from the outside may be used without the built-in battery in the assembled battery management device 200.

The CPU 220 controls the operation of the wireless circuit 210 and the memory 240. The wireless circuit 210 operates in response to the control of the CPU 220, and executes the processing and control for the assembled battery management device 200 to perform wireless communication with each of the battery cell management devices 100. The wireless circuit 210 modulates a request for measurement information from each battery cell management device 100 in accordance with a predetermined transmission frequency, using the power supply voltage Vdd supplied from the power supply circuit 230, and outputs the request to the antenna 250. In response to this request, the measurement information corresponding to the state of each battery cell of the battery cell group 10 is transmitted from each battery cell management device 100 to the assembled battery management device 200 by a wireless signal. The wireless signal transmitted from the battery cell management device 100 and received by the antenna 250 is demodulated by the wireless circuit 210 and is output to the CPU 220. Thus, the measurement information acquired by each of the battery cell management devices 100 is decoded by the CPU 220, and the processing corresponding to its content is performed as needed.

As described above, the assembled battery management device 200 acquires the battery state detected by each of the battery cell management devices 100, by performing the wireless communication with each of the battery cell management devices 100. In this case, the assembled battery management device 200 operates as a master to lead the communication, and each of the battery cell management devices 100 operates as a slave that communicates according to an instruction of the master. Each battery cell management device 100 transmits the result to the assembled battery management device 200 as needed after performing an operation according to the requirement of the assembled battery management device 200.

Each battery cell management device 100 has two communication modes which are a normal communication mode and a relayed communication mode. The normal communication mode is a communication mode for performing wireless communication with the assembled battery management device 200. In the normal communication mode, each of the battery cell management devices 100 receives the wireless signal transmitted from the assembled battery management device 200 and operates according to an instruction of the wireless signal, as described above. On the other hand, the relayed communication mode is a communication mode for relaying wireless communication between another battery management device 100 and the assembled battery management device 200. In the relayed communication mode, each of the battery cell management devices 100 temporarily receives the wireless signal transmitted from the assembled battery management device 200 to another battery cell management device 100, and then transfers the wireless signal to the battery cell management device 100. Also, the battery cell management device 100 temporarily receives the wireless signal transmitted in reply from another battery cell management device 100 to the assembled battery management device 200, and transfers the wireless signal to the assembled battery management device 200. The switching between these communication modes is performed in response to an instruction from the assembled battery management device 200.

Figure 3:
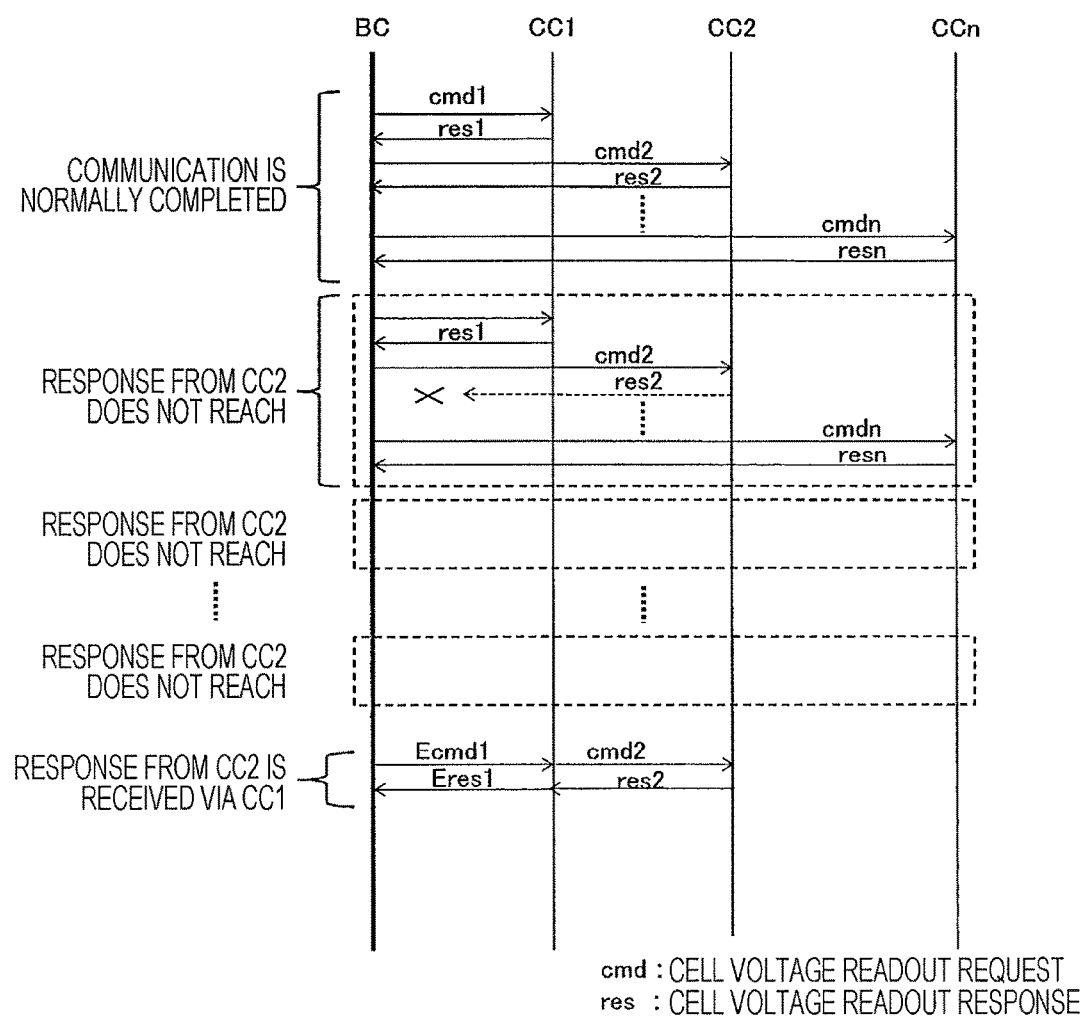
FIG. 3 is a diagram illustrating an example of a communication sequence between an assembled battery management device and each of battery cell management devices according to a first embodiment of the present invention.

FIG. 3 is a diagram illustrating an example of a communication sequence between the assembled battery management device 200 and each battery cell management device 100 according to a first embodiment of the present invention. In FIG. 3, the assembled battery management device 200 is represented as "BC" and a first, second and n-th battery cell management devices 100 in order of communication are represented as "CC1", "CC2" and "CCn" respectively. Note that the illustrations of a third to n−1th battery cell management devices 100 are omitted. Hereinafter, FIG. 3 will be described using these signs.

As shown in FIG. 3, first, the assembled battery management device BC transmits a command signal cmd1 for requesting a voltage value of the corresponding battery cell group 10 to the battery cell management device CC1 by wireless communication. The battery cell management device CC1 which has received the command signal cmd1 operates in the normal communication mode to detect the voltage of each battery cell of the battery cell group 10 connected with the battery cell management device CC1. Then, the battery cell management device CC1 transmits a response signal res1 including a detected voltage value data in reply to the assembled battery management device BC by wireless communication.

Then the assembled battery management device BC similarly transmits a command signal cmd2 for requesting a voltage value of corresponding battery cell group 10 also to the battery cell management device CC2 by wireless communication. The battery cell management device CC2 which has received this command signal cmd2 operates in the normal communication mode to detect the voltage of each battery cell of the battery cell group 10 connected with the battery cell management device CC2. Then, the battery cell management device CC2 transmits a response signal res2 including a detected voltage value data in reply to the assembled battery management device BC by wireless communication.

The assembled battery management device BC performs the transmission of a command signal and the reception of a response signal by the wireless communication as described above, once with respect to each battery cell management device in order from the first battery cell management device CC1 to the n-th battery cell management device CCn. Such wireless communication is periodically repeated between the assembled battery management device BC and each of the battery cell management devices CC1 to CCn. Thereby, the assembled battery management device BC periodically can obtain the voltage value of each battery cell group 10, as data for calculating the SOC of each battery cell group 10, from each of the battery cell monitoring devices CC1 to CCn.

Here, as shown in FIG. 3, in the first wireless communication, assume that the assembled battery management device BC receives normally the response signals res1 to resn from all of the battery cell management devices CC1 to CCn and the communication is completed normally. On the other hand, in the wireless communication for the second time or later, assume that a communication failure occurs on a path of the wireless communication between the assembled battery management device BC and the battery cell management device CC2, and the assembled battery management device BC does not receive the response signal res2 from the battery cell management device CC2. In this case, an assembled battery management device BC performs wireless communication with the battery cell management device CC2 by the following method.

Incidentally, a communication failure on a path of the wireless communication is known to occur generally due to the surrounding radio-wave propagation environment. For example, when a multipath is created by reflection from a guardrail or a road existing near the vehicle equipped with the in-vehicle system of FIG. 1, since the wireless signals respectively passing through different propagation paths interfere with each other, the battery cell management device CC2 or the assembled battery management device BC may not be able to obtain receivable wireless signals normally. In such a case, the assembled battery management device BC cannot normally receive the response signal res2 in response to the command signal cmd2 from the battery cell management device CC2, despite having transmitted the command signal cmd2 to the battery cell management device CC2.

In the present embodiment, when the assembled battery management device BC cannot normally receive the response signal res2 from the battery cell management device CC2 as described above, the assembled battery management device BC detects a communication error with respect to the battery cell management device CC2, and continues the wireless communication. After repeating this, when the assembled battery management device BC successively detects the communication error with respect to the battery cell management device CC2, and when the number of successive communication errors is greater than or equal to a predetermined threshold value, the assembled battery management device BC determines that the wireless communication with the battery cell management device CC2 is impossible. Then, the assembled battery management device BC performs the wireless communication with the battery cell management device CC2 through any of the battery cell management devices capable of the wireless communication among the other battery cell management devices (battery cell management device CC1 in the example of FIG. 3).

To be specific, the assembled battery management device BC transmits a relay command signal Ecmd1 to the battery cell management device CC1 by wireless communication. The relay command signal Ecmd1 includes instruction information for switching the communication mode of the battery cell management device CC1 to the above-mentioned relayed communication mode, information for identifying the battery cell management device CC2 of the transfer destination, and information relating to the command signal cmd2 for the battery cell management device CC2. The battery cell management device CC1 which has received the relay command signal Ecmd1 from the assembled battery management device BC switches the communication mode to the relayed communication mode based on its contents, and generates the command signal cmd2 to send the command signal cmd2 to the battery cell management device CC2.

After sending the command signal cmd2 to the battery cell management device CC2, the battery cell management device CC1 waits for the response signal res2 to be transmitted from the battery cell management device CC2 which has received the command signal cmd2. When the response signal res2 is transmitted from the battery cell management device CC2, the battery cell management device CC1 receives the response signal res2, and transmits the same content to the assembled battery management device BC as the relay response signal Eres1.

In the manner described above, when the assembled battery management device BC determines that wireless communication with the battery cell management device CC2 is impossible, the assembled battery management device BC performs wireless communication with the battery cell management device CC2 via another battery cell management device CC1. Thus, when a communication failure has occurred on a path of the wireless communication between the assembled battery management device BC and the battery cell management device CC2, the radio-wave propagation environment is changed by performing wireless communication using a different path and the communication failure can be avoided.

In the above, when it is impossible to wirelessly communicate between the assembled battery management device BC and the battery cell management device CC2, an example of performing wireless communication between the assembled battery management device BC and the battery cell management device CC2 through the battery cell management device CC1 is described with reference to FIG. 3. This also applies to other battery cell management devices. That is, when it is impossible to wirelessly communicate with any of the plurality of battery cell management devices 100 which the battery control system 1 shown in FIG. 1 has, the assembled battery management device 200 selects one of the plurality of battery cell management devices 100 except the said battery cell management device, and wireless communication can be performed with the said battery cell management device via the battery management device. At this time, the battery cell management device to be selected, for example, may be one disposed as close to or far away from the battery cell management device as possible, with which wireless communication is determined to be impossible. Alternatively, operable battery cell management devices in the relayed communication mode are determined in advance, and a battery cell management device capable of wireless communication may be selected thereamong.

According to a first embodiment of the present invention described above, the following function effects are achieved.

(1) The battery control system 1 has a plurality of battery cell management devices 100 that are provided respectively corresponding to the plurality of battery cell groups 10 each composed of one or a plurality of the battery cells and that each acquire the measurement result relating to the state of charge of the battery cells in the corresponding battery cell group 10 and the assembled battery management device 200 that performs wireless communication with the plurality of battery cell management devices 100. When the wireless communication with any of the plurality of battery cell management devices 100 is impossible, the assembled battery management device 200 performs wireless communication with the said battery cell management device via one of the plurality of battery cell management devices 100 except the said battery cell management device. With this configuration, a communication failure which has occurred on a path of the wireless communication between the battery cell management device 100 and the assembled battery management device 200 can be avoided.

(2) The assembled battery management device 200 periodically repeats wireless communication performed once with each of the plurality of battery cell management devices 100, and when the number of successive communication errors with respect to any battery cell management device is greater than or equal to a predetermined threshold value, a determination is made that the wireless communication with the battery cell management device is impossible. With this configuration, when the wireless communication with any of the battery cell management devices becomes temporarily impossible due to a communication failure on a path of wireless communication, wireless communication with the battery cell management device can be reliably determined to be impossible.

(3) a plurality of battery cell management devices 100 each have a normal communication mode for performing wireless communication with the assembled battery management device 200 and a relayed communication mode for relaying information transmitted and received between the assembled battery management device 200 and another battery cell management device. When the wireless communication with any of the plurality of battery cell management devices 100 is impossible, the assembled battery management device 200 operates at least one of the plurality of battery cell management devices 100 except the said battery cell management device in the relayed communication mode. With this configuration, the wireless communication via another battery cell management device capable of wireless communication can be easily achieved.

Second Embodiment

Next a second embodiment of the present invention will be described. In the first embodiment described above, an example has been described, in which when it is impossible to wirelessly communicate between the assembled battery management device 200 and any of the battery cell management devices 100, wireless communication is performed between the assembled battery management device 200 and the said battery cell management device through one of the battery cell management devices except the said battery cell management device. In contrast, in the second embodiment to be described hereinafter, an example will be described, in which wireless communication is performed between the assembled battery management device 200 and the battery cell management device 100 with which the wireless communication is determined to be impossible by using other methods.

Incidentally, the configurations of the in-vehicle system and a battery control system of this embodiment are the same as those shown in FIGS. 1 and 2 in the first embodiment respectively. However, in the present embodiment different from the first embodiment, each of the battery cell management devices 100 does not need to have two communication modes of the normal communication mode and the relayed communication mode, and needs to have only a normal communication mode. Since other points are similar to the first embodiment, the description about the configurations of the in-vehicle system and the battery control system will be omitted hereinafter.

Figure 4:
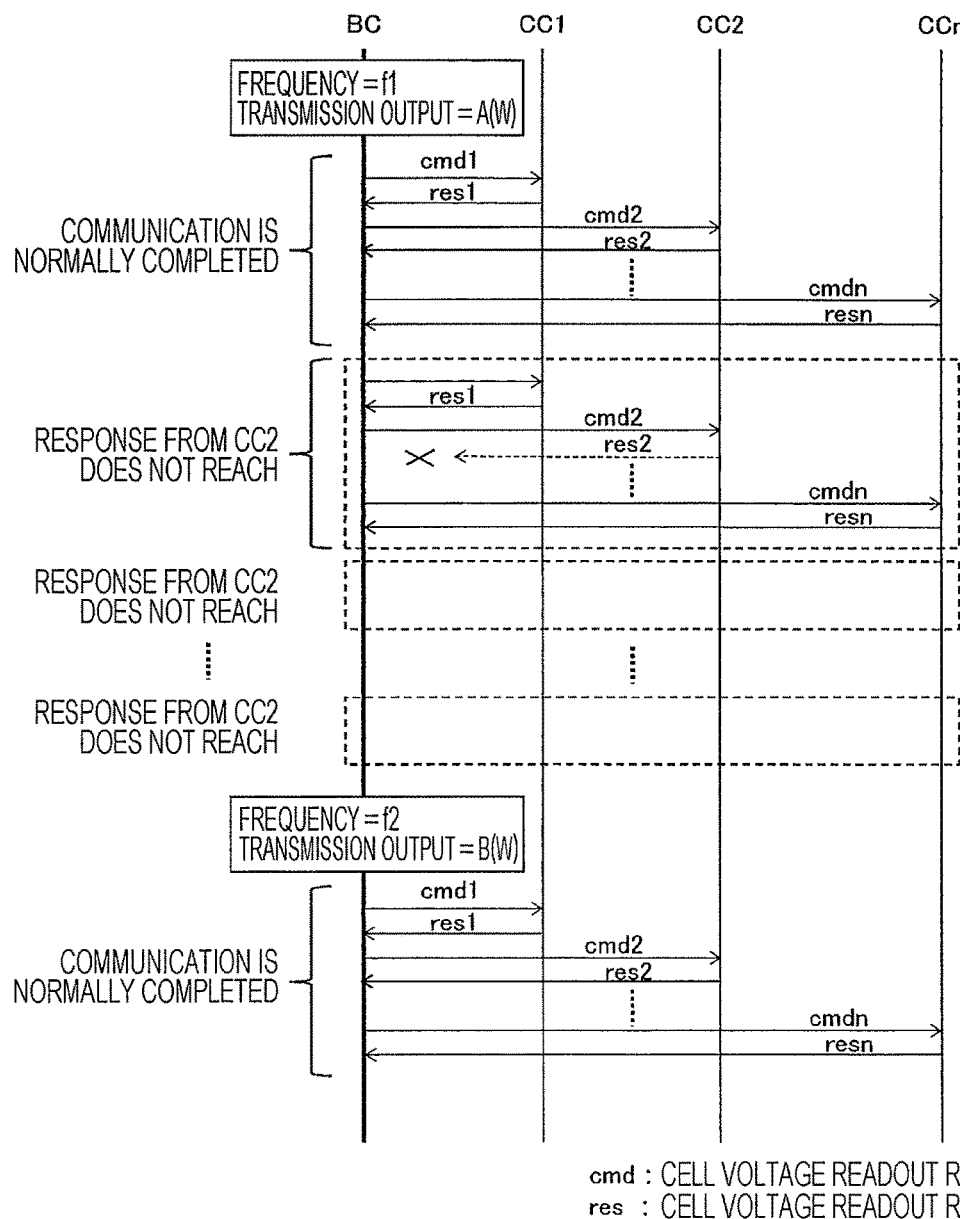
FIG. 4 is a diagram illustrating an example of a communication sequence between an assembled battery management device and each of battery cell management devices according to a second embodiment of the present invention.

FIG. 4 is a diagram illustrating an example of a communication sequence between the assembled battery management device 200 and the battery cell management devices 100 in the second embodiment of the present invention. Also in FIG. 4, similarly to FIG. 3, the assembled battery management device 200 is represented as "BC", and the first, second, and n-th battery cell management devices 100 in order of communication are represented as "CC1", "CC2" and "CCn" respectively.

As shown in FIG. 4, first, the assembled battery management device BC sets the frequency to f1 and the transmission output to A, and then sends a command signal cmd1 for requesting the voltage value of the corresponding battery cell group 10 to the battery cell management device CC1 by wireless communication. The battery cell management device CC1 which has received the command signal cmd1 detects the voltage of each battery cell of the battery cell group 10 connected with the battery cell management device CC1. Then, the battery cell management device CC1 transmits a response signal res1 including detected voltage value data in reply to the assembled battery management device BC, by wireless communication in the same frequency f1 and the same transmission output A as those of the command signal cmd1.

Then, the assembled battery management device BC similarly transmits the command signals cmd2 to cmdn for requesting the voltage value of the corresponding battery cell group 10 also to the battery cell management devices CC2 to CCn respectively by wireless communication with the frequency set to f1 and the transmission output set to A. The battery cell management devices CC2 to CCn which have received the command signals cmd2 to cmdn respectively detect the voltage of each battery cell of the battery cell group 10 connected with each of the battery cell management devices CC2 to CCn, and transmit the response signals res2 to resn including detected voltage value data in reply respectively, to the assembled battery management device BC, by the wireless communication of the frequency f1 and the transmission output A.

Here, in the same manner as described in the first embodiment, as shown in FIG. 4, in the first wireless communication, assume that the assembled battery management device BC receives normally the response signals from all of the battery cell management devices CC1 to CCn and the communication is completed normally. On the other hand, in the wireless communication for the second time or later, assume that due to a communication failure having occurred on a path of the wireless communication between the assembled battery management device BC and the battery cell management device CC2, the assembled battery management device BC does not receive the response signal res2 from the battery cell management device CC2. In this case, the assembled battery management device BC performs wireless communication with the battery cell management device CC2 by the following methods.

In the present embodiment, when the assembled battery management device BC determines that the wireless communication with the battery cell management device CC2 is impossible by a similar method to that in the first embodiment, the assembled battery management device BC changes the set values of the frequency and the transmission output in subsequent wireless communication. To be more specific, the frequency is changed from f1 to f2, and the transmission output is changed from A to B to perform wireless communication with each of the battery cell management devices CC1 to CCn. In this case, information relating to the frequency and the transmission output to be used for transmitting the response signals res1 to resn to the assembled battery management device BC from each of the battery cell management devices CC1 to CCn may be included in the command signals cmd1 to cmdn.

The transmission output is preferably set such that B is greater than A. Hence, when a communication failure of the wireless communication has occurred on a path between the assembled battery management device BC and the battery cell management device CC2, the occurrence distribution of the multipath is changed by changing the frequency, and in addition, the transmission output is increased to be able to avoid the communication failure.

In the above description, an example in a case where it is impossible to wirelessly communicate between the assembled battery management device BC and the battery cell management device CC2 is described with reference to FIG. 4. This also applies to other battery cell management devices. In other words, when it is impossible to wirelessly communicate with any of the plurality of battery cell management devices 100 which the battery control system 1 shown in FIG. 1 has, the assembled battery management device 200 can change the frequency and transmission output of the wireless communication such that the assembled battery management device 200 can perform wireless communication with each of the battery cell management devices 100. At this time, frequency and transmission output of wireless communication for all of the battery cell management devices 100 may be changed as shown in FIG. 4, or the frequency and transmission output of the wireless communication may be changed only for the battery cell management device 100 with which the wireless communication is determined to be impossible. Further, only one of the frequency and the transmission power of the wireless communication may be changed such that the other may be kept as it is.

In addition, the frequency and the transmission output used when the command signals cmd1 to cmdn are transmitted to each of the battery cell management devices CC1 to CCn from the assembled battery management device BC and the frequency and transmission output used when the response signals res1 to resn in reply are transmitted to the assembled battery management device BC from each of the battery cell management devices CC1 to CCn do not need to be identical respectively. Further, when the wireless communication is determined to be impossible between the assembled battery management device BC and any of the battery cell management devices CC1 to CCn, the frequency or transmission output may be changed for either the command signals cmd1 to cmdn transmitted from the assembled battery management device BC to each of the battery cell management devices CC1 to CCn or the response signals res1 to resn transmitted in reply from each of the battery cell management devices CC1 to CCn to the assembled battery management device BC.

According to the second embodiment of the present invention described above, when wireless communication with any of the plurality of battery cell management devices 100 is impossible, the assembled battery management device 200 performs the wireless communication with the battery cell management device, by changing one or both of the frequency and the transmission output of the wireless communication. With this configuration, similarly to the first embodiment, a communication failure having occurred on a path of the wireless communication between the battery cell management device 100 and the assembled battery management device 200 can be avoided.

Third Embodiment

Next a third embodiment of the present invention will be described. In the first and second embodiments described above, an example has been described in which the wireless communication with the battery cell management device is determined to be impossible when the number of successive communication errors between one of the battery cell management devices and the assembled battery management device 200 is greater than or equal to a predetermined threshold value. In contrast, in the third embodiment described below, an example of determining whether it is impossible to wirelessly communicate by other methods is described.

The configurations of the in-vehicle system and the battery control system in the present embodiment are the same as those shown in FIGS. 1 and 2 respectively in the first embodiment similarly to those described in the second embodiment. Accordingly, description will be omitted about the configurations of the in-vehicle system and the battery control system hereinafter.

Figure 5:
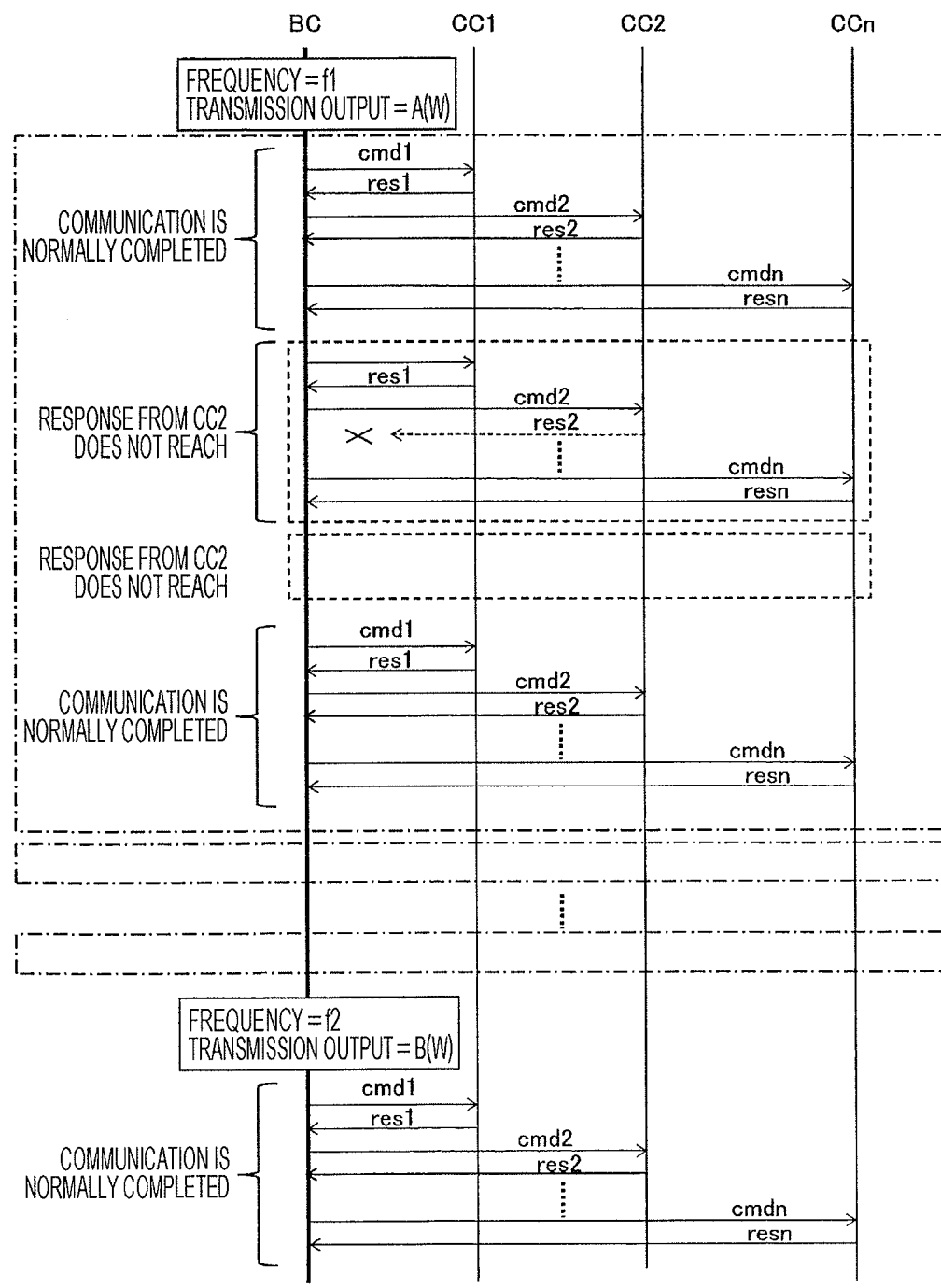
FIG. 5 is a diagram illustrating an example of a communication sequence between an assembled battery management device and each of battery cell management devices according to a third embodiment of the present invention.

FIG. 5 is a diagram illustrating an example of a communication sequence between the assembled battery management device 200 and the battery cell management devices 100 according to the third embodiment of the present invention. Also in this FIG. 5, similarly to FIGS. 3 and 4, the assembled battery management device 200 is represented as "BC", and the first, second, n-th battery cell management devices 100 in order of communication are represented as "CC1", "CC2" and "CCn" respectively.

In FIG. 5, wireless communication is performed between the assembled battery management device BC and the battery cell management devices CC1 to CCn according to a similar procedure to that in FIG. 4 described in the second embodiment. That is, the assembled battery management device BC transmits the command signals cmd1 to cmdn for requesting the voltage value of the corresponding battery cell group 10 to the battery cell management devices CC1 to CCn respectively by wireless communication of the frequency f1 and the transmission output A. The battery cell management devices CC1 to CCn that have respectively received the command signals cmd1 to cmdn detects the voltage of each battery cell of the battery cell group 10 connected with each of the battery cell management devices CC1 to CCn, and respectively transmit the response signals res1 to resn including detected voltage value data in reply to the assembled battery management device BC by the wireless communication.

Here, as shown in FIG. 5, in the first wireless communication, assume that the response signals from all the battery cell management devices CC1 to CCn are normally received by the assembled battery management device BC, and the communication is normally completed. On the other hand, in the wireless communication for the second time or later, assume that the assembled battery management device BC does not receive the response signal res2 from the battery cell management device CC2 and the state is repeated several times, due to a communication failure having occurred on a path of the wireless communication between the assembled battery management device BC and the battery cell management device CC2, and then, has been restored to normal. In this case, the assembled battery management device BC calculates the ratio of communication errors with respect to the battery cell management device CC2 by obtaining the ratio of the number of times that the assembled battery management device BC could not normally receive the response signal res2 to the number of times of transmission of the command signal cmd2. Alternatively, the assembled battery management device BC may calculate the ratio of communication errors with respect to the battery cell management device CC2 by obtaining the number of times that the assembled battery management device BC could not normally receive the response signal res2 in a predefined period of time. Thus the assembled battery management device BC determines that wireless communication with the battery cell management device CC2 is impossible when the calculated ratio of the communication errors becomes greater than or equal to a predetermined threshold value.

According to the method as described above, when it is determined that the wireless communication with the battery cell management device CC2 is impossible, the assembled battery management device BC, similarly to the second embodiment, changes the set values of the frequency and transmission output in subsequent wireless communication. To be more specific, the assembled battery management device BC changes the frequency from f1 to f2 and the transmission output from A to B to perform wireless communication with each of the battery cell management devices. Hence, when a communication failure of the wireless communication has occurred on a path between the assembled battery management device BC and the battery cell management device CC2, the occurrence distribution of the multipath is changed by changing the frequency, and in addition, the transmission output is increased in order to avoid the communication failure.

In the above, an example of a case where the wireless communication between the assembled battery management device BC and the battery cell management device CC2 is determined to be impossible is described with reference to FIG. 5. This also applies to other battery cell management devices. That is, when the ratio of communication errors with respect to any battery cell management device among the plurality of battery cell management devices 100 that the battery control system 1 shown in FIG. 1 has, is greater than or equal to a predetermined threshold value, it can be determined that wireless communications with the battery cell management device is impossible.

In the above embodiment, an example was described in which when determining that wireless communication with the battery cell management device CC2 is impossible, the assembled battery management device BC avoids a communication failure similarly to the second embodiment, by changing the set values of the frequency and the transmission output in subsequent wireless communication. However, a communication failure may be avoided in the same manner as the first embodiment. In other word, when it is determined that wireless communication with the battery cell management device CC2 is impossible, the assembled battery management device BC may perform wireless communication with the battery cell management device CC2 via another battery cell management device, for example, via the battery cell management device CC1.

According to the third embodiment of the present invention described above, it is possible to achieve same effects as those described in the first and the second embodiments.

Incidentally, the above embodiments may be freely combined. For example, according to the combination of the first and second embodiments, when determining that the wireless communications is impossible with any of the battery cell management devices 100, the assembled battery management device 200 performs wireless communication with the battery cell management device 100 via another battery cell management device 100. At this time, the battery cell management device 100 that relays the wireless communication changes one or both of the frequency and transmission output when the operations is changed between operations in the normal communication mode and in the relayed communication mode according to an instruction of the assembled battery management device 200. In this manner, a communication failure having occurred on a path of the wireless communication between the battery cell management device 100 and the assembled battery management device 200 can be avoided more reliably.

Further, the embodiments and examples of various modifications described above are merely examples, and as long as the features of the invention are not impaired, the present invention is not limited to these contents.

REFERENCE SIGNS LIST 1 battery control system
10 battery cell group
20 sensor
30 processing unit
31 power supply circuit
32 AD converter
33 CPU
34 memory
40 wireless circuit
50 antenna
100 battery cell management device
200 assembled battery management device
210 wireless circuit
220 CPU
230 power supply circuit
240 memory
250 antenna

The invention claimed is:

1. A battery control system comprising:
a plurality of battery cell management devices that are provided respectively corresponding to a plurality of battery cell groups each constituted by one or a plurality of battery cells and that each acquire a measurement result of a state of charge of the one or the plurality of battery cells of corresponding one of the plurality of battery cell groups; and
an assembled battery management device that performs wireless communication with the plurality of battery cell management devices,
wherein when the wireless communication with any of the plurality of battery cell management devices is impossible, the assembled battery management device performs the wireless communication with the any of the plurality of battery cell management devices through one of the plurality of battery cell management devices except the any of the plurality of battery cell management devices,
wherein the assembled battery management device periodically repeats the wireless communication performed once with each of the plurality of battery cell management devices and, when a number of successive communication errors or a ratio of communication errors with respect to any of the plurality of battery cell management devices is greater than or equal to a predetermined threshold value, determines that the wireless communication is impossible with the any of the plurality of battery cell management devices.

2. The battery control system according to claim 1, wherein each of the plurality of battery cell management devices has a first communication mode for performing the wireless communication with the assembled battery management device and a second communication mode for relaying information which is transmitted and received between the assembled battery management device and another of the plurality of battery cell management devices, and
wherein when the wireless communication with any of the plurality of battery cell management devices is impossible, the assembled battery management device operates at least one of the plurality of battery cell management devices except the any of the plurality of battery cell management devices in the second communication mode.

3. The battery control system according to claim 2, wherein the assembled battery management device changes one or both of a frequency and transmission output of the wireless communication when changing operations of the plurality of battery cell management devices between operations in the first communication mode and in the second communication mode.

* * * * *